(12) United States Patent
Nash et al.

(10) Patent No.: US 9,718,489 B2
(45) Date of Patent: Aug. 1, 2017

(54) ADJUSTABLE STEERING COLUMN

(71) Applicant: STEERING SOLUTIONS IP HOLDING CORPORATION, Saginaw, MI (US)

(72) Inventors: Richard P. Nash, Frankenmuth, MI (US); Ravi Ravindra, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/194,698

(22) Filed: Jun. 28, 2016

(65) Prior Publication Data

US 2016/0304112 A1    Oct. 20, 2016

Related U.S. Application Data

(62) Division of application No. 14/547,205, filed on Nov. 19, 2014, now Pat. No. 9,415,792.

(60) Provisional application No. 61/907,105, filed on Nov. 21, 2013.

(51) Int. Cl.
  *B62D 1/184*    (2006.01)

(52) U.S. Cl.
  CPC ......... *B62D 1/184* (2013.01); *Y10T 29/49863* (2015.01); *Y10T 74/20636* (2015.01)

(58) Field of Classification Search
  CPC ........ B62D 1/184; B62D 1/185; B62D 1/187; B62D 1/189; B62D 1/181; B62D 1/183; B62D 1/18; B62D 1/16; B62D 1/19; B62D 1/192; B62D 1/195; B62D 1/197
  USPC ........... 280/775, 779, 780, 777; 74/493, 492
  See application file for complete search history.

(56) References Cited

U.S. PATENT DOCUMENTS

| | | | |
|---|---|---|---|
| 8,151,667 | B2 | 4/2012 | Appleyard et al. |
| 8,201,475 | B2 | 6/2012 | Rouleau et al. |
| 8,413,541 | B2 | 4/2013 | Davies et al. |
| 8,505,408 | B2 | 8/2013 | Havlicek |
| 2006/0237959 | A1 | 10/2006 | Dimig et al. |
| 2010/0288068 | A1 | 11/2010 | Klukowski |
| 2011/0265599 | A1 | 11/2011 | Owens |
| 2014/0352480 | A1 | 12/2014 | Butler et al. |

FOREIGN PATENT DOCUMENTS

DE    10055114 A1    5/2002

*Primary Examiner* — Keith J Frisby
(74) *Attorney, Agent, or Firm* — Cantor Colburn LLP

(57) ABSTRACT

In accordance with an exemplary embodiment of the invention, an adjustment assembly for allowing or preventing adjustment of a component is provided. The adjustment assembly includes a first bracket at least partially surrounding the component, a second bracket at least partially surrounding the first bracket, and a piezoelectric device biasing against one of the first bracket or the second bracket in a first position, the piezoelectric device configured to contract and release the bias against one of the first bracket and the second bracket in a second position.

8 Claims, 6 Drawing Sheets

ADJUSTABLE STEERING COLUMN

CROSS-REFERENCES TO RELATED APPLICATIONS

This patent application is a divisional of U.S. patent application Ser. No. 14/547,205, filed Nov. 19, 2014 which in turn claims priority to U.S. Provisional Patent Application Ser. No. 61/907,105, filed Nov. 21, 2013, both of which are incorporated herein by reference in their entirety.

BACKGROUND OF THE INVENTION

The following description relates to an adjustment assembly, and more particularly, to an adjustment assembly actuated by a piezoelectric device.

Conventional adjustment assemblies, for example, adjustment assemblies which allow for adjustment of a steering column in a vehicle, include a lever that is rotatable between two positions to lock and unlock the adjustment assembly. For example, with a lever in a first position, the adjustment assembly may lock a steering column in a desired position, thereby fixing the steering column against adjustment. The lever may be rotated to a second position, thereby unlocking the adjustment assembly and allowing the steering column to be adjusted.

However, the rotational travel path of these levers may occupy a large area. Accordingly, surrounding components (e.g., interior vehicle panels) must be designed to provide sufficient clearance to accommodate the rotational travel path of the lever. In some cases the surrounding components need to be redesigned or modified to provide sufficient clearance. Further, the rotational travel path may inconvenience a user of the adjustment assembly, as the travel path may interfere with a space occupied by the user.

Smaller levers may be used. However, reducing the size of the lever also reduces the mechanical advantage provided by the lever. Thus, a smaller rotational lever may be more difficult to actuate since the smaller lever requires a larger force to actuate. Additionally, some known adjustment assemblies require heavy, expensive motors to lock the system and include many interworking components such as levers, cams, and followers.

Accordingly, it is desirable to provide an adjustment assembly with reduced components and simplified operation.

SUMMARY OF THE INVENTION

In accordance with an exemplary embodiment of the invention, an adjustment assembly for allowing or preventing adjustment of a component is provided. The adjustment assembly includes a first bracket at least partially surrounding the component, a second bracket at least partially surrounding the first bracket, and a piezoelectric device biasing against one of the first bracket or the second bracket in a first position, the piezoelectric device configured to contract and release the bias against one of the first bracket and the second bracket in a second position.

In accordance with another exemplary embodiment of the invention, an adjustable steering column assembly is provided. The assembly includes a steering column, a compression bracket at least partially surrounding the steering column, and a rake bracket at least partially surrounding the compression bracket. The assembly further includes a piezoelectric device biasing against one of the compression bracket or the rake bracket in a first position preventing adjustment of the steering column, the piezoelectric device configured to contract to reduce the biasing against one of the compression bracket or the rake bracket in a second position to enable adjustment of the steering column.

In accordance with yet another exemplary embodiment of the invention, a method of assembling an adjustable steering column is provided. The method includes providing a steering column, providing a compression bracket, and disposing the compression bracket at least partially about the steering column. The method further includes providing a rake bracket, disposing the rake bracket at least partially about the compression bracket, providing a piezoelectric device biasing against one of the compression bracket or the rake bracket in a first position preventing adjustment of the steering column, applying a voltage to the piezoelectric device, and releasing the bias against one of the compression bracket or the rake bracket in a second position to enable adjustment of the steering column.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
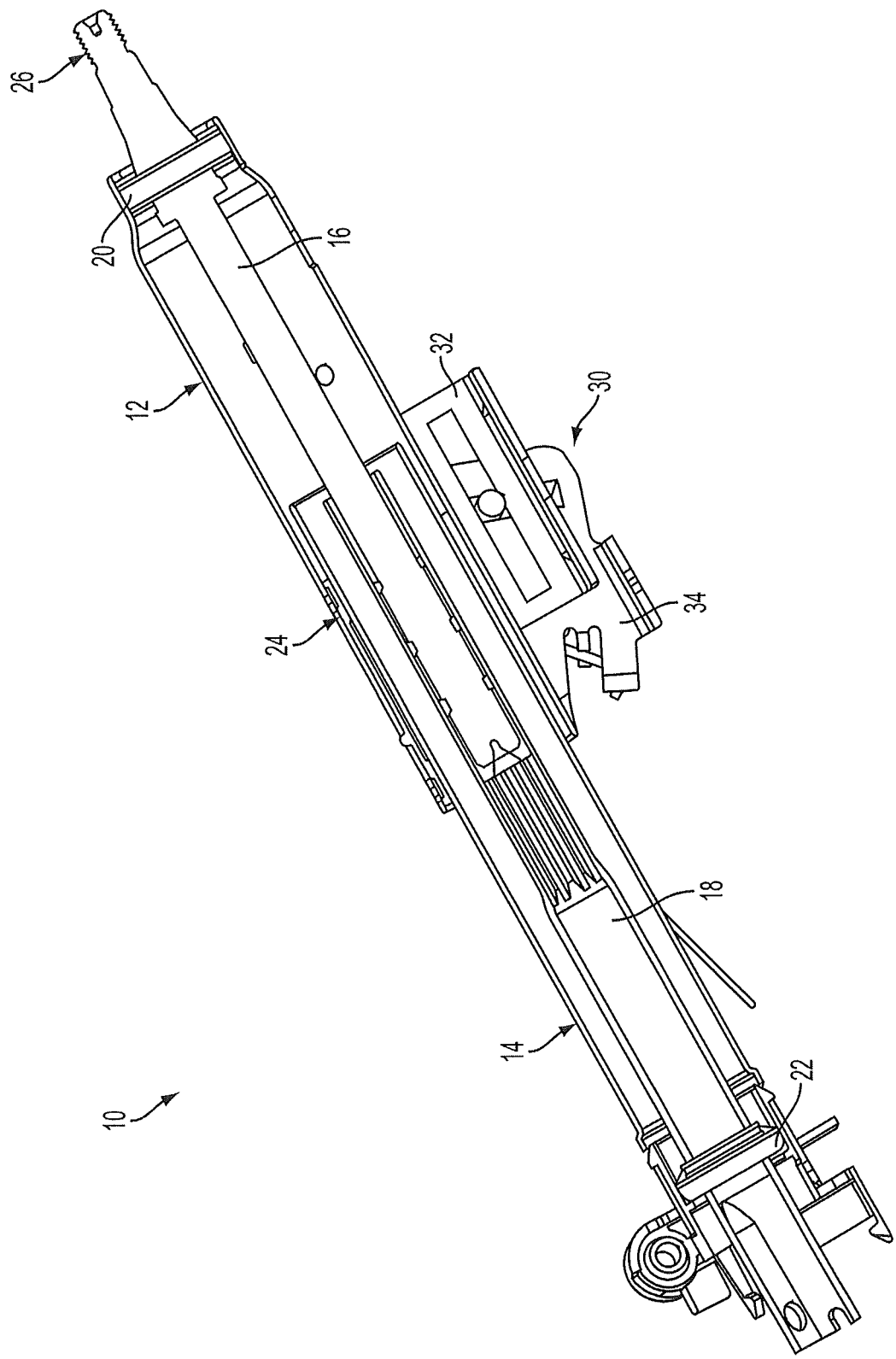
FIG. 1 is a cross-sectional view of an exemplary steering column assembly of the invention.
Figure 2:
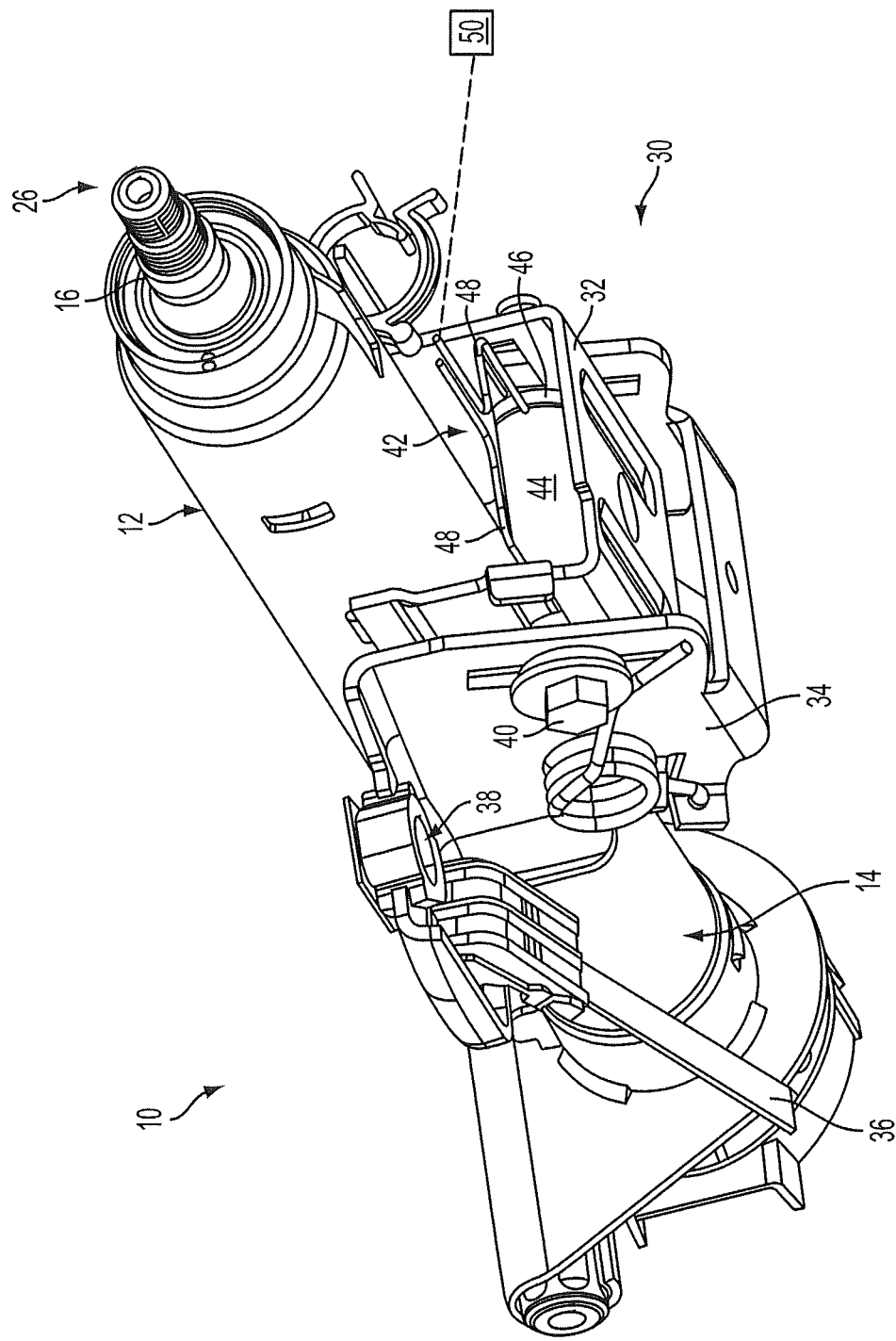
FIG. 2 is a perspective view of the steering column assembly shown in FIG. 1 with an exemplary adjustment assembly.

Referring now to the Figures, where the invention will be described with reference to specific embodiments, without limiting same, FIGS. 1 and 2 illustrate steering column assembly 10 having an adjustment assembly 30 to selectively enable telescoping and/or raking movement of steering column assembly 10. Column assembly 10 generally includes an upper jacket 12 and a lower jacket 14, which house an upper shaft 16 and a lower shaft 18. In the exemplary embodiment, shaft 18 telescopically slides within upper shaft 16. Alternatively, upper shaft 16 may telescopically slide within lower shaft 18. Lower shaft 18 and upper shaft 16 are supported by an upper bearing 20 and a lower bearing 22.

In the exemplary embodiment, steering column assembly 10 includes a telescoping bushing 24 positioned between upper jacket 12 and lower jacket 14, and a steering wheel end 26 configured to couple to a steering wheel (not shown).

Adjustment assembly or adjustment locking assembly 30 generally includes a compression bracket 32, a rake bracket 34, and a piezoelectric (PE) locking device 42. In the exemplary embodiment, compression bracket 32 is coupled to upper jacket 12, and rake bracket 34 includes energy absorbing straps 36 and mounting holes 38 for coupling rake bracket 34 to a vehicle (not shown). A rake bolt 40 extends through rake bracket 34 and compression bracket 32 to facilitate locking steering column assembly 10 in a desired position, as described herein in more detail. FIGS. 1 and 2 illustrate column assembly 10 with a substantially circular cross-section. Alternatively, steering column assembly 10 may have a substantially rectangular cross-section or any suitable cross-section that enables assembly 10 to function as described herein.

Figure 3:
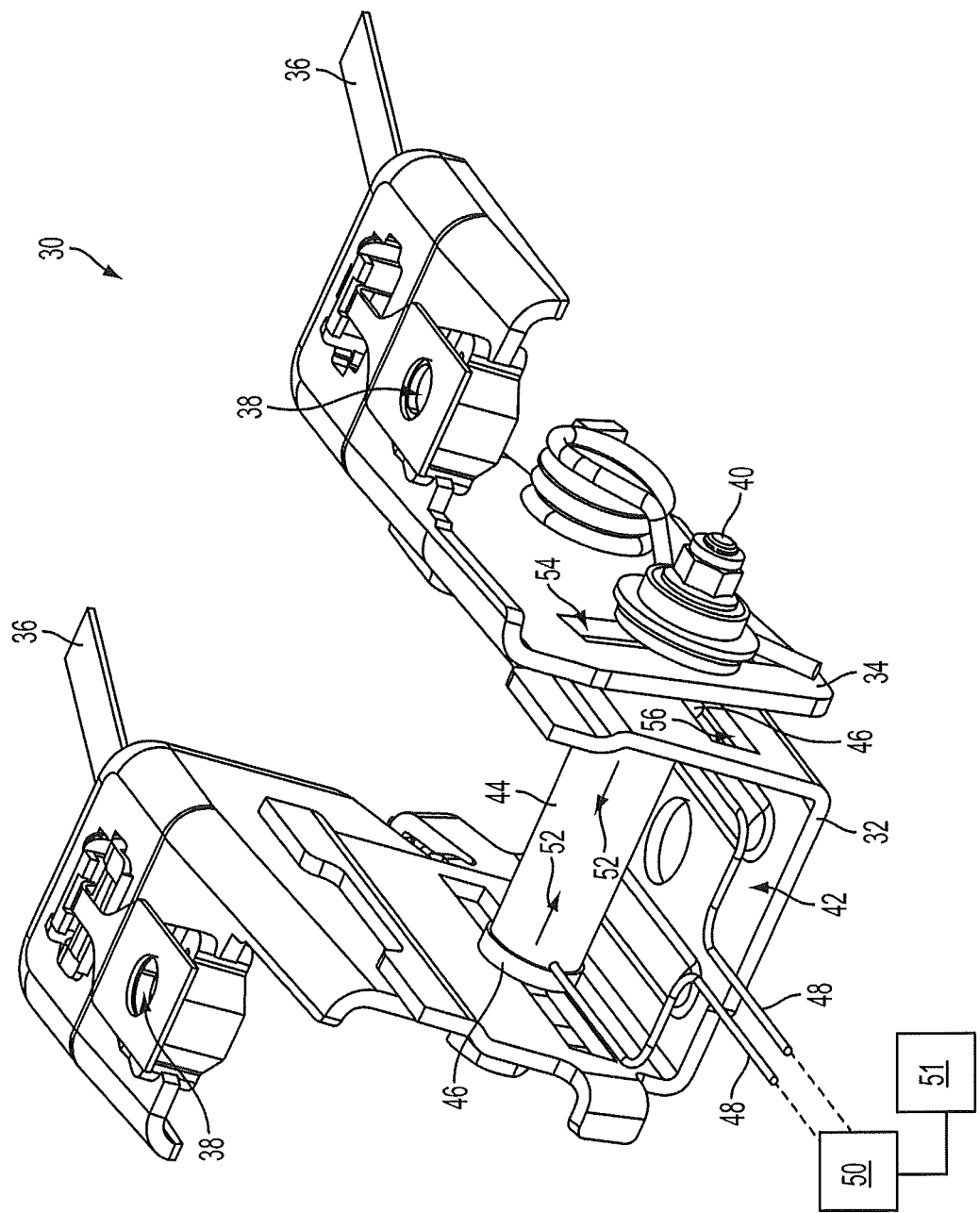
FIG. 3 is a perspective view of the adjustment assembly shown in FIG. 2.

FIGS. 2 and 3 illustrate adjustment assembly 30 with exemplary PE locking device 42. The piezoelectric effect is understood as the linear electromechanical interaction between the mechanical and the electrical state in crystalline materials with no inversion symmetry. The piezoelectric effect is a reversible process in that materials exhibit the direct piezoelectric effect (the internal generation of electrical charge resulting from an applied mechanical force) also exhibit the reverse piezoelectric effect (the internal generation of a mechanical strain resulting from an applied electrical field).

In the exemplary embodiment, PE locking device 42 includes a PE tube 44, washers 46, and lead wires 48. One end of each lead wire 48 is electrically coupled to tube 44, and lead wires 48 are coupled to a suitable power source 51 and a release and lock switch 50. Power source 51 may include a DC automotive battery, a separate battery solely for powering PE locking device 42 as further described herein, or could be a dual function battery source such as that found on a key fob used for keyless entry of an automobile. In an exemplary embodiment, release and lock switch 50 is located on the vehicle steering wheel (not shown). However, release and lock switch 50 may be located in any suitable location within reach of an operator. For example, switch 50 may be located on a vehicle dashboard (not shown), or on the above described key fob (not shown).

In the exemplary embodiment, PE tube 44 is inserted over rake bolt 40 between washers 46. PE tube 44 at least partially biases compression bracket 32 against rake bracket 34 to lock steering column assembly 10 such that it is prevented from telescopic or raking movement in a first locked position. The two ends of PE tube 44 carry lead wires 48, which are connected to the suitable power source. When activation switch 50 is pressed or closed, a voltage is passed through PE tube 44, which causes PE tube 44 to axially contract in the direction of arrows 52 in a second unlocked position. Contraction of PE tube 44 relieves or reduces the compressive force biasing compression bracket 32 against rake bracket 34, which allows free movement creating slack between compression bracket 32 and rake bracket 34. At this point, column assembly 10 can be adjusted by moving it up and down in a rake slot 54 and/or forward and backward in a telescope slot 56. Once the desired position is reached, an operator may release switch 50 to facilitate terminating the voltage to PE tube 44, which causes PE tube 44 to expand back to its original length. Subsequently, PE tube 44 again biases compression bracket 32 against rake bracket 34, thus locking column assembly 10.

Figure 4:
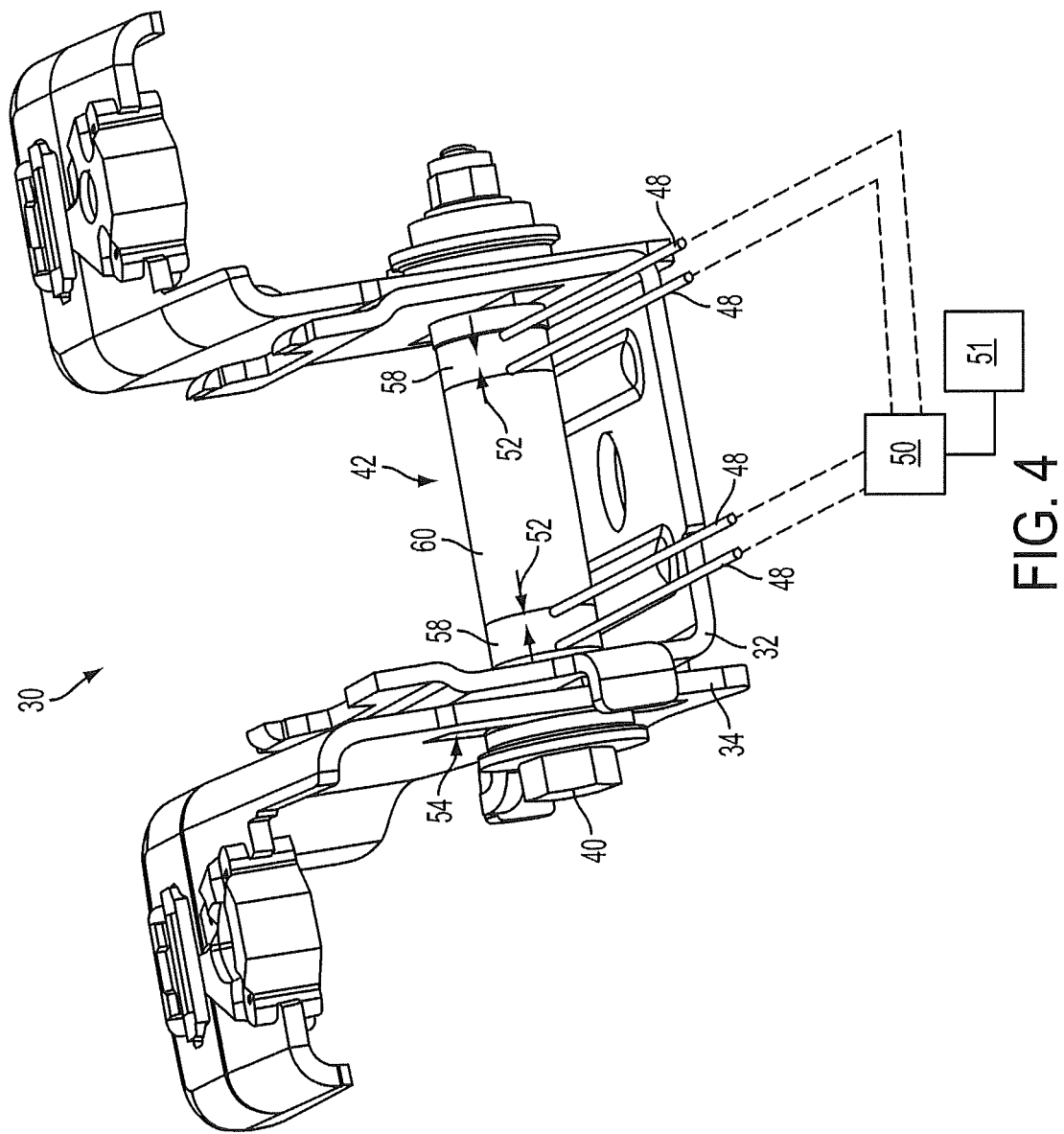
FIG. 4 is a perspective view of an alternative embodiment of the adjustment assembly shown in FIG. 3.

FIG. 4 illustrates another exemplary embodiment of PE locking device 42, which includes a pair of PE washers 58 and a tube 60 therebetween. In the exemplary embodiment, tube 60 is fabricated from a metal such as steel. However, tube 60 may be fabricated from any suitable material that enables assembly 30 to function as described herein. Steel tube 60 and PE washers 58 are inserted onto rake bolt 40, and a pair of leads 48 is connected to each PE washer 58. When switch 50 is activated or closed, a voltage passes through PE washers 58, which causes PE washers 58 to axially contract in the direction of arrows 52 in a second unlocked position. Contraction of PE washers 58 relieves or reduces the compressive force that biases compression bracket 32 against rake bracket 34, which allows free movement and creates slack between compression bracket 32 and rake bracket 34. At this point, column assembly 10 can be adjusted by moving it up and down in rake slot 54 and/or forward and backward in telescope slot 56. Once the desired position is reached, an operator may release and open switch 50 to facilitate terminating the voltage to PE washers 58, which causes PE washers 58 to expand back to their original length to a first locked position. Subsequently, PE washers 58 again bias compression bracket 32 against rake bracket 34 to lock column assembly 10.

Figure 5:
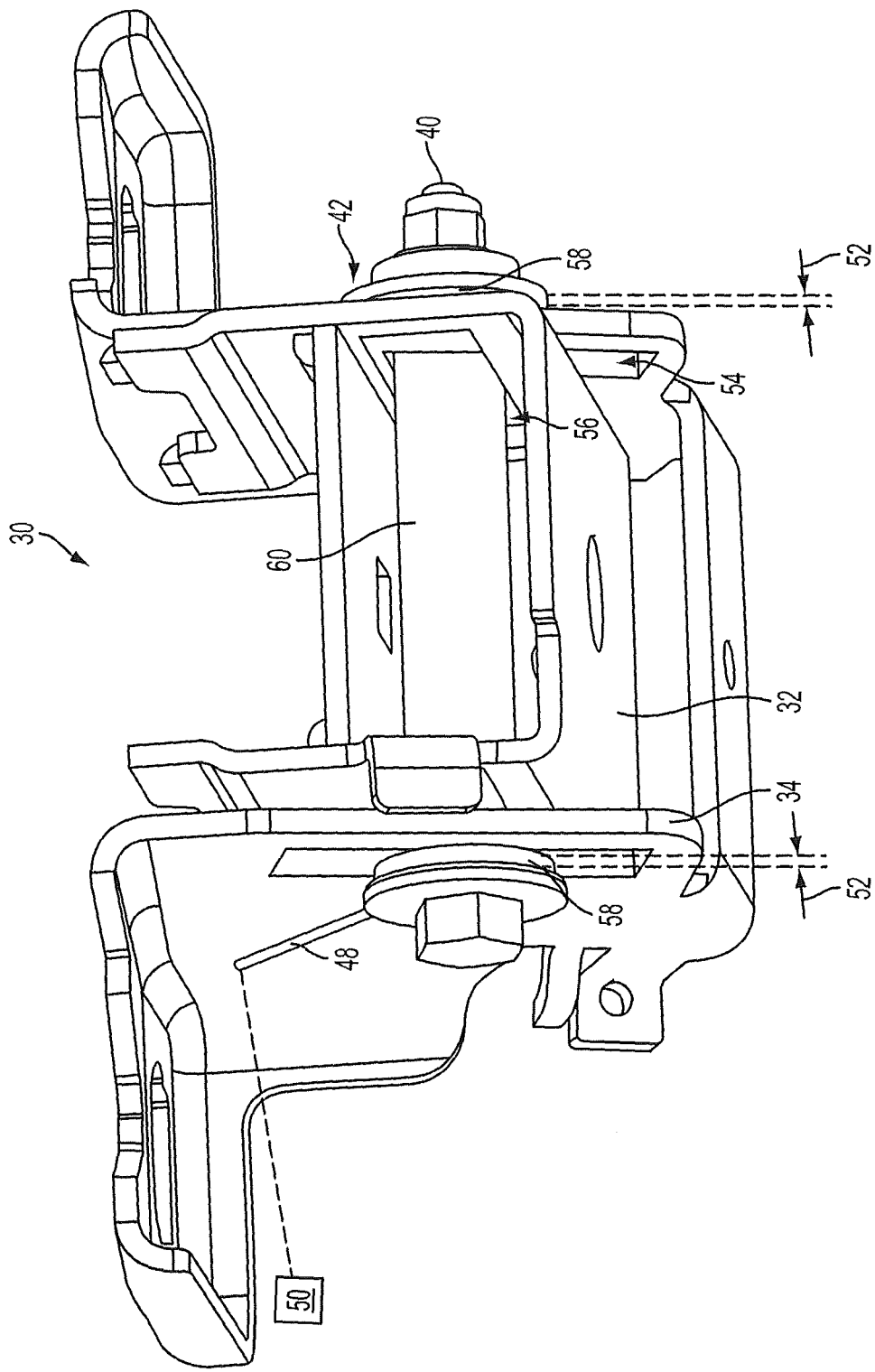
FIG. 5 is a perspective view of another alternative embodiment of the adjustment assembly shown in FIG. 3.

FIG. 5 illustrates another exemplary embodiment of PE locking device 42 that is similar to the arrangement shown FIG. 4, except PE washers 58 are arranged on rake bolt 40 outboard of rake bracket 34; whereas in the embodiment of FIG. 4, PE washers 58 are arranged on rake bolt 40 inboard of compression bracket 32.

Figure 6:
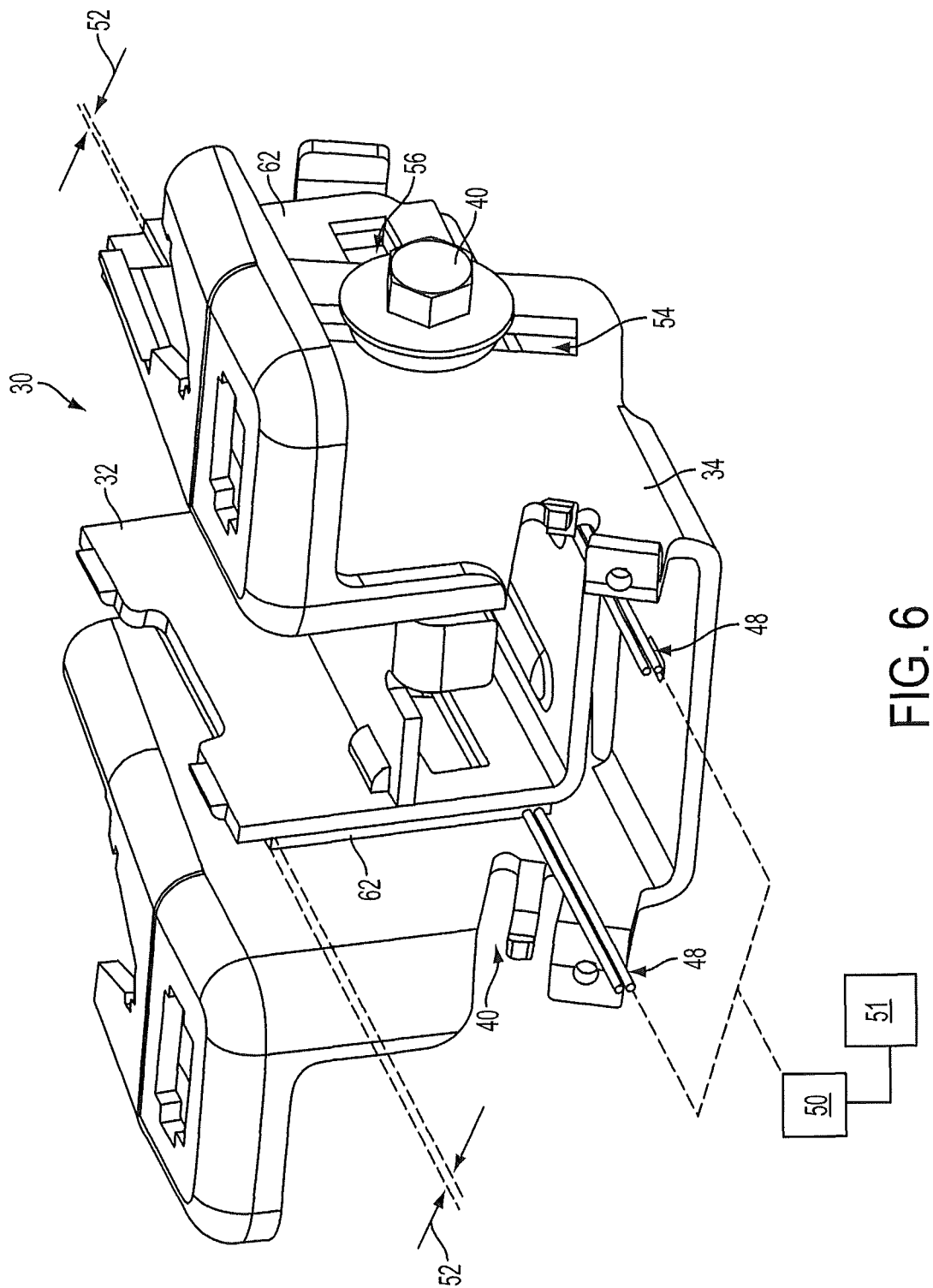
FIG. 6 is a perspective view of yet another alternative embodiment of the adjustment assembly shown in FIG. 3.

FIG. 6 illustrates another exemplary embodiment of PE locking device 42. In the exemplary embodiment, a PE strip 62 is inserted between compression bracket 32 and rake bracket 34. PE strips 62 bias against compression bracket 32 and rake bracket 34 to lock steering column assembly 10 such that it is prevented from telescopic or raking movement. Each PE strip 62 carries lead wires 48, which are connected to a suitable power source. When activation switch 50 is pressed, a voltage is passed through PE strips 62, which causes PE strips 62 to contract. Contraction of PE strips 62 relieves or reduces the force that biases against compression bracket 32 and rake bracket 34, which allows free movement and creates slack between PE strips 62, compression bracket 32, and rake bracket 34. At this point, column assembly 10 can be adjusted by moving it up and down in rake slot 54 and/or forward and backward in telescope slot 56. Once the desired position is reached, an operator may release and open switch 50 to facilitate terminating the voltage to PE strips 62, which causes PE strips 62 to expand back to their original size. Subsequently, PE strips 62 again bias against compression bracket 32 and rake bracket 34 to lock column assembly 10. Although two PE strips 62 are illustrated in the exemplary embodiment, PE locking device 42 may include any number of PE strips 62. For example, PE locking device 42 may include one or three PE strips 62.

As described herein PE device 42 provides a biasing force to bracket 32 and/or 34 to prevent steering column movement until PE device 42 contracts with an applied voltage. Alternatively, PE device 42 may bias bracket 32 and/or 34 to prevent movement when the voltage is applied to PE device 42, and subsequently contract when the voltage is removed, thereby releasing the biasing force.

A method of assembling adjustable steering column assembly 10 includes providing a steering column (e.g., shafts 16, 18), compression bracket 32, rake bracket 34, and PE locking device 42. Compression bracket 32 is disposed at least partially about the steering column, and rake bracket 34 is disposed at least partially about compression bracket 32. Rake bolt 40 is inserted through brackets 32, 34 and PE locking device 42 is disposed to bias compression bracket 32 against rake bracket 34 to facilitate preventing adjustment of the steering column. PE device 42 is configured to contract when a voltage is applied thereto to facilitate reducing or removing the biasing force of compression bracket 32 against rake bracket 34 to enable adjustment of steering column assembly 10.

Described herein are assemblies for allowing or preventing adjustment of a component. In some embodiments, the component is a steering column. The adjustment assembly includes a piezoelectric locking device that locks a steering column by biasing a compression bracket against a rake bracket to prevent relative movement therebetween. A release and lock switch selectively connects the piezoelectric locking device and a suitable power source. When the release and lock switch is activated, a voltage is passed through the piezoelectric locking device and the piezoelectric locking device contracts. The contraction of the locking device enables relative movement between the compression bracket and the rake bracket, which enables the steering column to be positioned in a desired orientation. Release of the lock switch expands the piezoelectric locking device to its original size, thereby locking the steering column in the desired orientation. The assemblies described herein do not require typical cams, followers, levers, and/or motors, which facilitates lighter and simpler adjustment assemblies.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustment locking assembly, comprising:
    a first bracket at least partially surrounding a component;
    a second bracket at least partially surrounding the first bracket;
    a piezoelectric device biasing against one of the first bracket or the second bracket in a first position, the piezoelectric device configured to contract and release the bias of one of the first bracket and the second bracket in a second position; and
    a bolt extending through the first and second brackets, the piezoelectric device arranged on the bolt.

2. The assembly of claim 1, wherein the piezoelectric device is a piezoelectric tube.

3. The assembly of claim 2, wherein the piezoelectric tube is disposed within the first bracket.

4. The assembly of claim 1, wherein the piezoelectric device is at least one piezoelectric strip.

5. The assembly of claim 4, wherein the at least one piezoelectric strip is disposed between the first and second brackets.

6. An adjustment locking assembly comprising:
    a first bracket at least partially surrounding a component;
    a second bracket at least partially surrounding the first bracket; and
    a piezoelectric device biasing against one of the first bracket or the second bracket in a first position, the piezoelectric device configured to contract and release the bias of one of the first bracket and the second bracket in a second position, wherein the piezoelectric device is at least one piezoelectric washer.

7. The assembly of claim 6, wherein the at least one piezoelectric washer is disposed within the first bracket.

8. The assembly of claim 6, wherein the at least one piezoelectric washer is disposed outboard of the second bracket.

* * * * *